United States Patent [19]

Hehl

[11] Patent Number: 4,863,368
[45] Date of Patent: Sep. 5, 1989

[54] INJECTION MOLDING MACHINE FOR A SELECTIVE LINEAR OR CENTRAL CHARGING OF MOLD ASSEMBLIES

[76] Inventor: Karl Hehl, Arthur-Hehl-Strasse 32, D-7298 Lossburg 1, Fed. Rep. of Germany

[21] Appl. No.: 226,537

[22] Filed: Jul. 29, 1988

[30] Foreign Application Priority Data

Jul. 30, 1987 [DE] Fed. Rep. of Germany ....... 3725220

[51] Int. Cl.$^4$ .............................................. B29C 45/07
[52] U.S. Cl. .................. 425/547; 264/328.8; 264/328.11; 425/572; 425/574; 425/588
[58] Field of Search ............... 425/190, 547, 572, 574, 425/588; 264/328.8, 328.11

[56] References Cited

U.S. PATENT DOCUMENTS

| | | | |
|---|---|---|---|
| 3,464,091 | 9/1969 | Bielfeldt | 425/574 |
| 3,577,843 | 5/1971 | Kutik et al. | 425/547 |
| 3,806,294 | 4/1974 | Hehl | 425/574 |
| 4,680,002 | 7/1987 | Hehl | 425/190 |
| 4,708,622 | 11/1987 | Hehl | 425/574 |

FOREIGN PATENT DOCUMENTS

| | | |
|---|---|---|
| 1852612 | 3/1962 | Fed. Rep. of Germany . |
| 6942324 | 10/1969 | Fed. Rep. of Germany . |
| 1554768 | 6/1970 | Fed. Rep. of Germany . |
| 2504719 | 8/1976 | Fed. Rep. of Germany . |
| 3630416 | 3/1987 | Fed. Rep. of Germany . |
| 1507102 | 4/1978 | United Kingdom . |
| 2181089 | 4/1987 | United Kingdom . |

OTHER PUBLICATIONS

"Schnecken-Spritzgiessmaschinen" Krauss-Maffei München pp. 14–15.

Primary Examiner—Jay H. Woo
Assistant Examiner—Timothy W. Heitbrink
Attorney, Agent, or Firm—Spencer & Frank

[57] ABSTRACT

An injection molding machine has a mold closing unit arranged on a machine bed and adapted to selectively receive a first type of mold assembly having a central injection opening or a second type of mold assembly having a non-central injection opening; a platform mounted on the machine bed; and an injection molding unit supported on the platform. The injection molding unit includes a carrier block; a plasticizing cylinder received in the carrier block and a feed screw received in the plasticizing cylinder. The injection molding unit is pivotal by a drive into a first working position in which the injection molding unit cooperates with a mold assembly of the first type or into a second working position in which the injection molding unit cooperates with a mold assembly of the second type. The platform has two parallel-spaced side plates which flank the carrier block. Axially aligned, spaced pivot shafts are connected to respective side plates and the carrier block at opposite sides thereof for supporting the injection molding unit on the side plates for pivotal motion.

11 Claims, 11 Drawing Sheets

INJECTION MOLDING MACHINE FOR A SELECTIVE LINEAR OR CENTRAL CHARGING OF MOLD ASSEMBLIES

BACKGROUND OF THE INVENTION

This invention relates to an injection molding machine which has a machine bed, a mold closing unit which is supported on the machine bed and which is adapted to selectively receive either a first type of mold assembly having a central injection opening and a central mold cavity and intended for a symmetrical injection (central charging) or a second type of mold assembly having an off-center injection opening and a central cavity and intended for an asymmetrical injection (linear charging). The injection molding machine further has a platform which is supported on the machine bed and which, in turn, supports an injection molding unit that includes a carrier block, as well as a plasticizing cylinder which is received in the carrier block as well and a feed screw which is received in the plasticizing cylinder. There is provided a first drive arrangement which is adapted to axially displace the injection molding unit as well as a second drive arrangement which is adapted to pivot the injection molding unit from a first working position defined by a central injection axis and serving the first type of mold assembly, into another working position in which the second type of mold assembly is served. The injection molding unit is swung in a pivot plane that includes the central injection axis.

In a known injection molding machine, as disclosed in German Gebrauchsmuster (utility patent) 1,852,612, a central mold charging or a linear mold charging of an injection mold assembly may be selectively performed, dependent on whether the mold closing unit holds a mold assembly with a central, or, respectively, a non-central injection opening. For this purpose, the platform on which the injection molding unit is mounted may be pivoted about a stationary horizontal axis. The hydraulic drive cylinder utilized as a drive arrangement for effecting the pivotal motion is supported on the axially fixed platform which forms a pivotal unit with the injection molding unit.

It is further known—as disclosed, for example, in German Gebrauchsmuster 6,942,324—to pivotally support the injection molding unit of an injection molding machine in such a manner that it may be pivoted out of a position determined by a central injection axis, into two opposite directions for maintenance purposes. The injection molding unit guided on columns is pivotal on a horizontal shaft which is supported in work cylinders that form part of the driving arrangement and which are oriented coaxially with the columns.

Further, as disclosed, for example, in German Offenlegungsschrift (non-examined published application) 2,504,719, an injection molding machine is known whose injection molding unit may be pivoted out of a working position determined by a central injection axis in a predetermined pivotal direction for performing maintenance work thereon. The pivot shaft is, for this purpose, supported in a yoke which may be shifted parallel to the injection axis.

It is further known—as disclosed, for example, in German Offenlegungsschrift 3,630,416—to remove plastic material from the injection molding unit by performing a "blank" injection step, prior to utilizing another plastic material in the plasticizing cylinder. For this purpose, a plate member is positioned in front of the injection opening of the injection mold assembly onto which the residual plastic material is ejected from the plasticizing cylinder in the course of the blank injection.

Frequently, with the change of the type of injection mold assemblies in the injection molding machine (for example, to effect a changeover from a central charging to a linear charging), there is associated a replacement of the plastic material which, in turn, requires a cleaning or replacement of the plasticizing cylinder.

SUMMARY OF THE INVENTION

It is an object of the invention to provide an improved injection molding machine of the above-outlined type which is not only capable of satisfying all requirements of injection technology that are encountered in practice in the making of plastic components of different configuration, size and material, based on a selectively chosen central or linear mold charging but, at the same time, also takes into account the functional and structural conditions in the utilization of a different plastic material, a different material mix or another filler without a substantial time or structural input.

This object and others to become apparent as the specification progresses, are accomplished by the invention, according to which, briefly stated, the injection molding machine has a mold closing unit arranged on a machine bed and adapted to selectively receive a first type of mold assembly having a central injection opening or a second type of mold assembly having a non-central injection opening; a platform mounted on the machine bed; and an injection molding unit supported on the platform. The injection molding unit includes a carrier block; a plasticizing cylinder received in the carrier block and a feed screw received in the plasticizing cylinder. The injection molding unit is pivotal by a drive into a first working position in which the injection molding unit cooperates with a mold assembly of the first type or into a second working position in which the injection molding unit cooperates with a mold assembly of the second type. The platform has two parallel-spaced side plates which flank the carrier block. Axially aligned, spaced pivot shafts are connected to respective side plates and the carrier block at opposite sides thereof for supporting the injection molding unit on the side plates for pivotal motion.

In an injection molding apparatus structured according to the invention, the pivotal motion and the structural means required therefor are designed such that the technological and time input for exchanging the plasticizing cylinder or performing a cleaning thereof may be maintained at a very low level and/or may be accelerated. This applies particularly in case of a program-controlled replacement of the plasticizing cylinder inasmuch as in the replacement the carrier block remains in the injection molding machine and merely the "bare" plasticizing cylinder is replaced. The cleaning of the plasticizing cylinder by means of a blank injection stroke may be effected readily by program control because a blank injection stroke substantially corresponds to a normal injection cycle and therefore, the technological input is minimal. The above-outlined structural concept for effecting pivotal motion may be materialized in the mass manufacture of the injection molding machine in two variants which, dependent upon the customer's requirements, may respectively perform a horizontal or a vertical pivotal motion. The machine may be converted from one variant to the other by exchanging only a minimum number of components (stationary mold carrier and platform). This and the simplified stock-keeping involved therewith reduce manufacturing costs.

DESCRIPTION OF THE PREFERRED EMBODIMENTS

Figure 1:
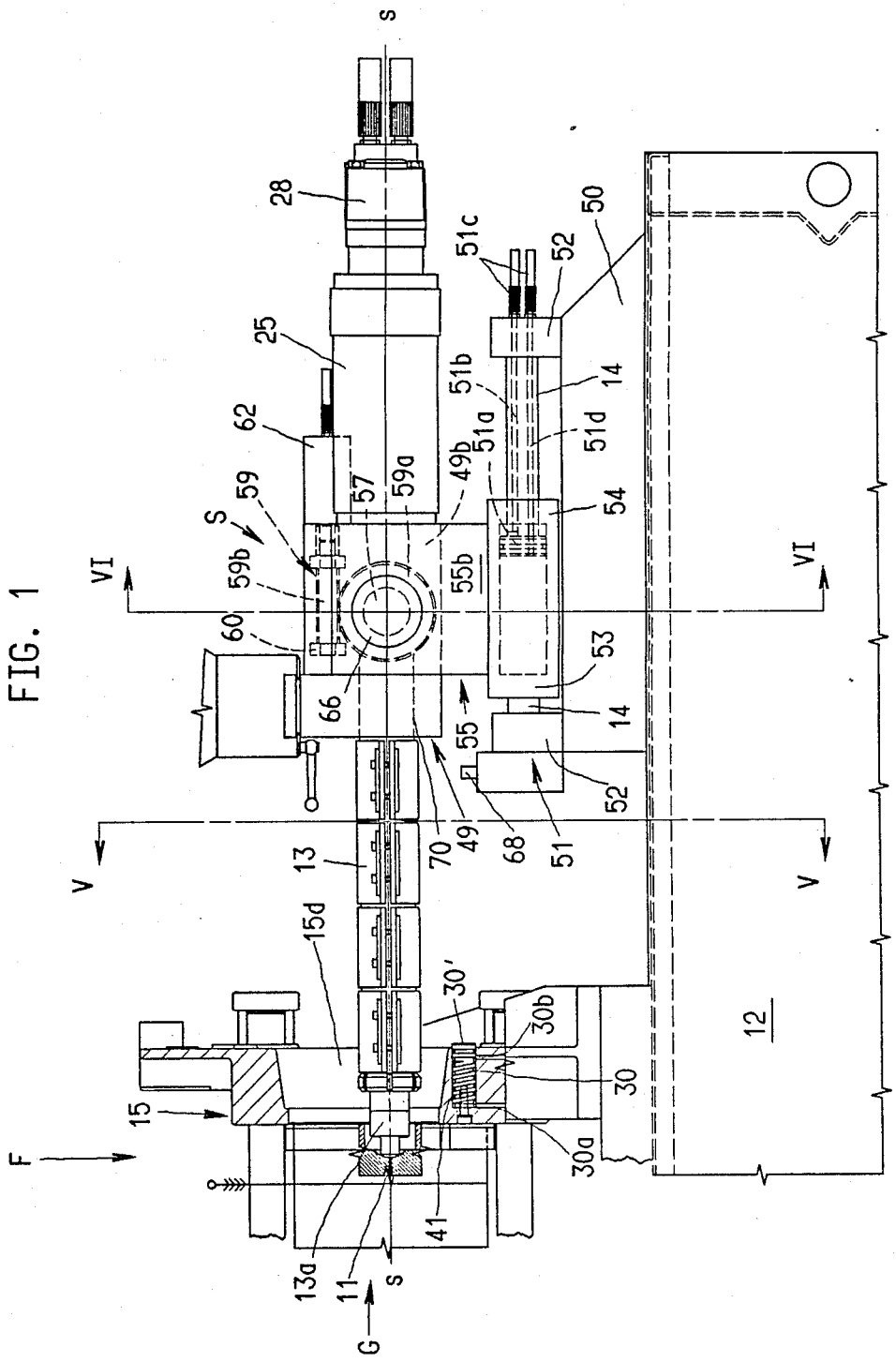
FIG. 1 is a partially sectional schematic side elevational view of a preferred embodiment of an injection molding machine according to the invention, positioned for injection along a central injection axis.
Figure 2:
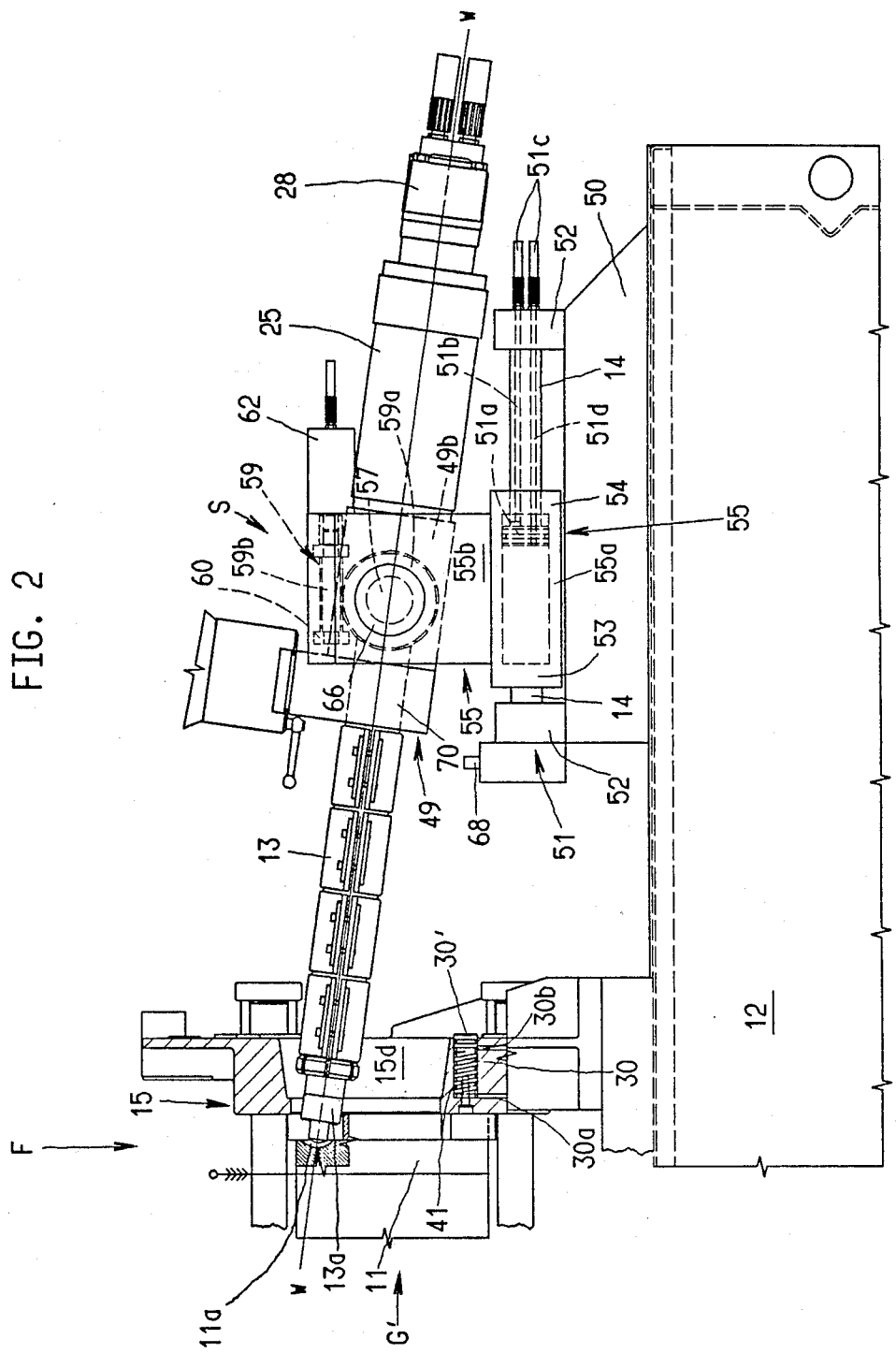
FIG. 2 is a view similar to Figure, showing the preferred embodiment positioned for injection other than along the central injection axis.

The two preferred embodiments shown in FIGS. 1-6 and 7-13, respectively, will be, in most parts of the description, set forth together; the reference numerals of functionally similar, but structurally or positionally different components of the second embodiment appear in brackets, following the reference numerals of the corresponding components of the first embodiment.

Turning to FIGS. 1, 2, 5, 6, 7, 12 and 13, there is shown an injection molding machine which has a machine bed 12 on which there is supported a horizontally shiftable, mold closing unit F whose stationary mold carrier 15 has a throughgoing passage 15d for allowing the nozzle 13a of a plasticizing cylinder 13 to pass therethrough.

Into the mold closing unit F there may be selectively clamped either a mold assembly G (FIG. 1) having a central injection opening 11 and a central mold cavity or a mold assembly G' (FIG. 2) which has a non-central injection opening 11a and a central mold cavity for an asymmetrical injection.

Figure 4:
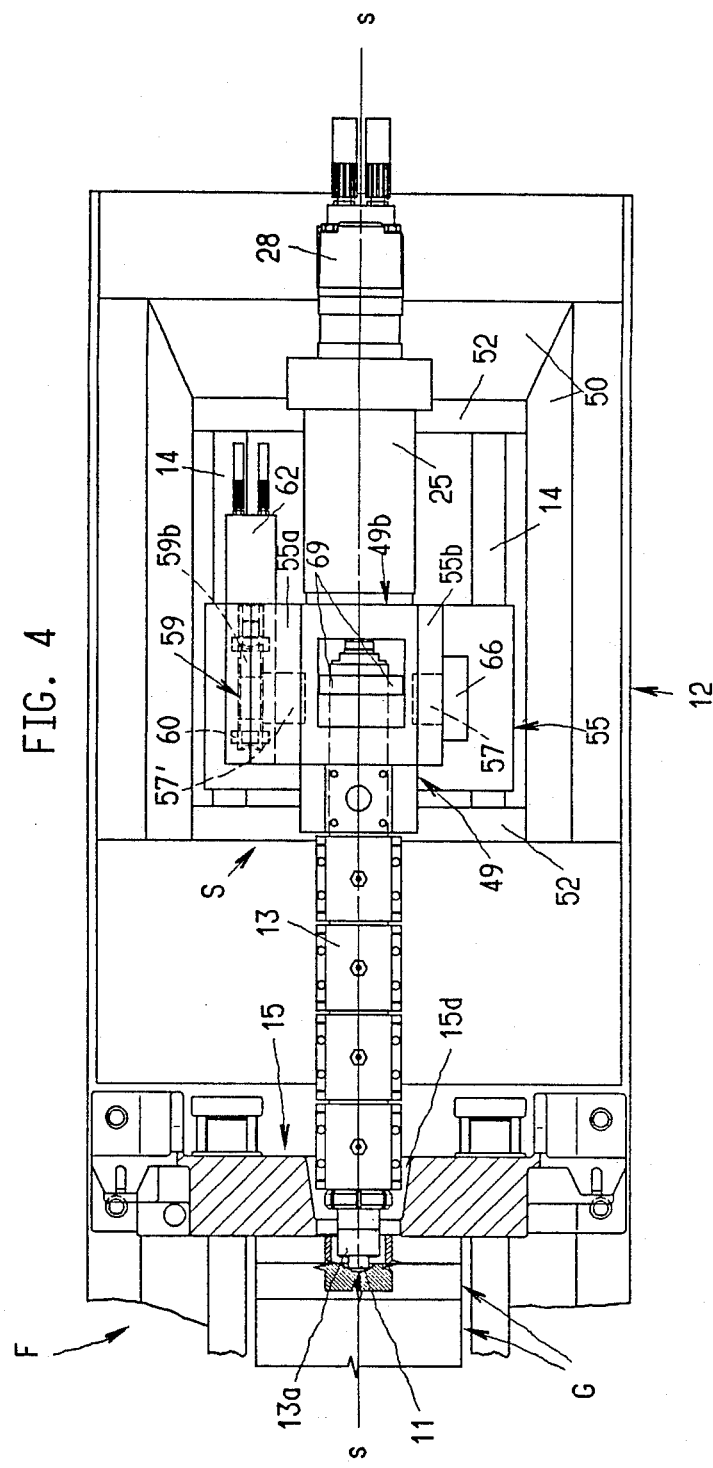
FIG. 4 is a partially sectional schematic top plan view of the construction shown in FIG. 1.
Figure 5:
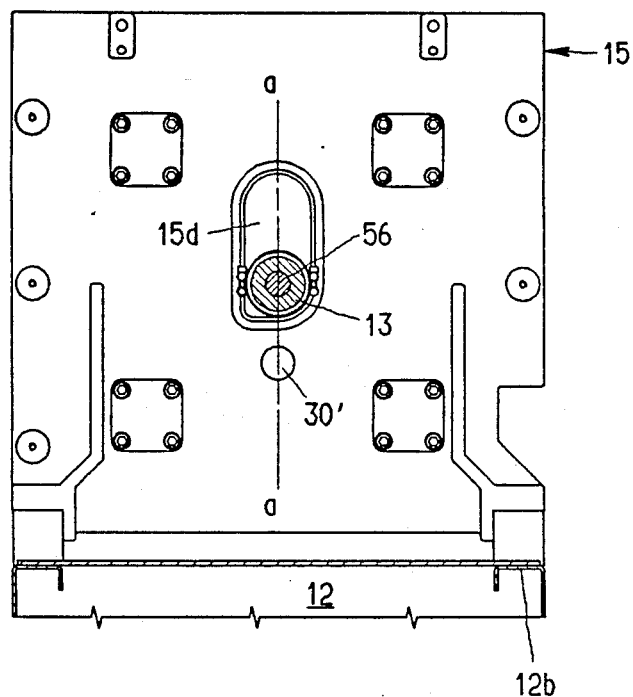
FIG. 5 is a sectional view taken along line V—V of FIG. 1.
Figure 6:
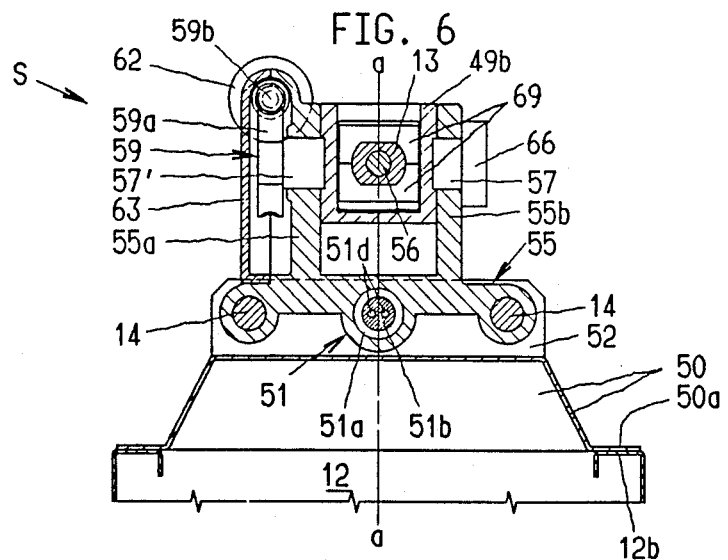
FIG. 6 is a sectional view taken along line VI—VI of FIG. 1.
Figure 7:
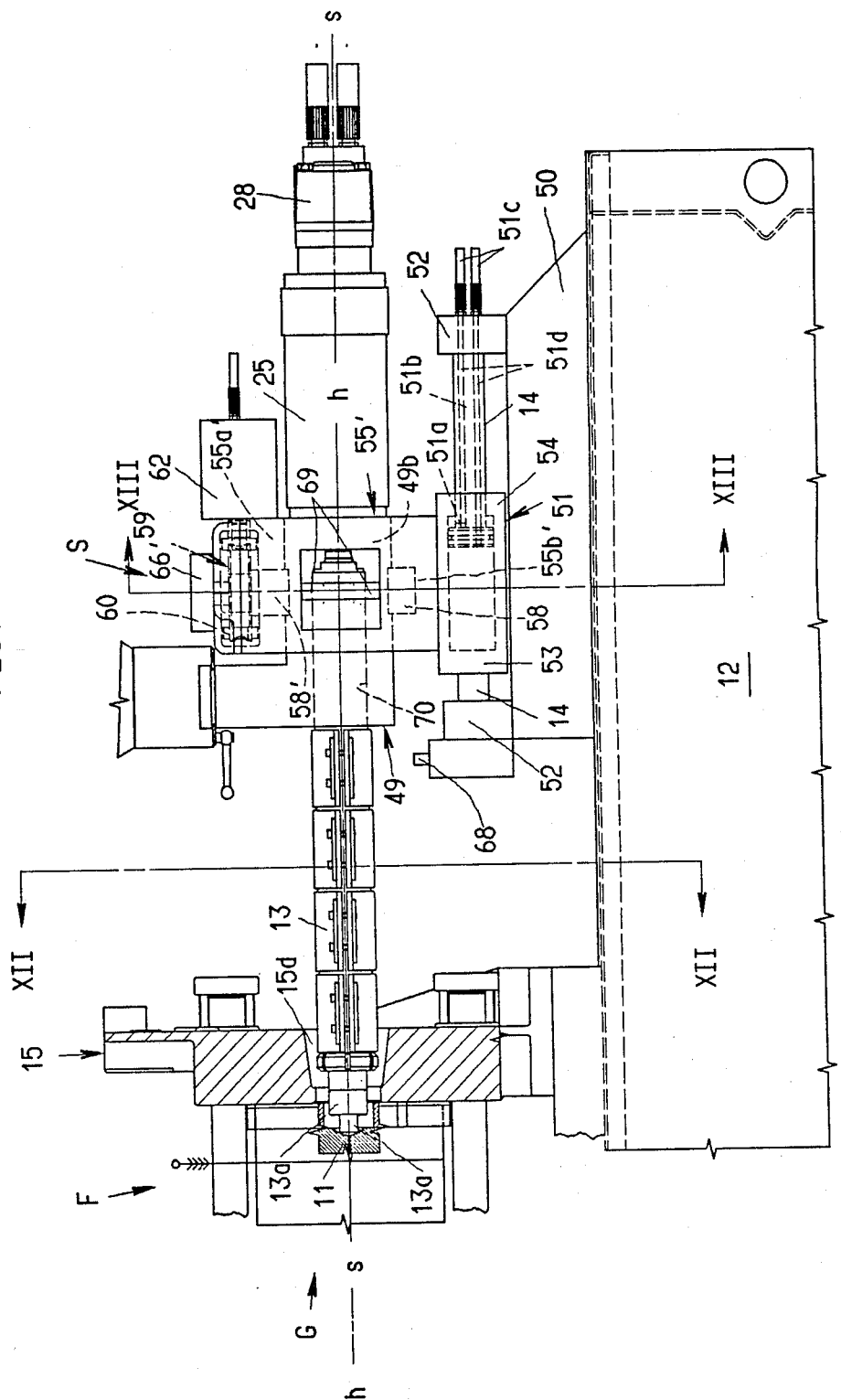
FIG. 7 is a partially sectional schematic side elevational view of a second preferred embodiment of an injection molding machine according to the invention, positioned for injection along a central injection axis.
Figure 8:
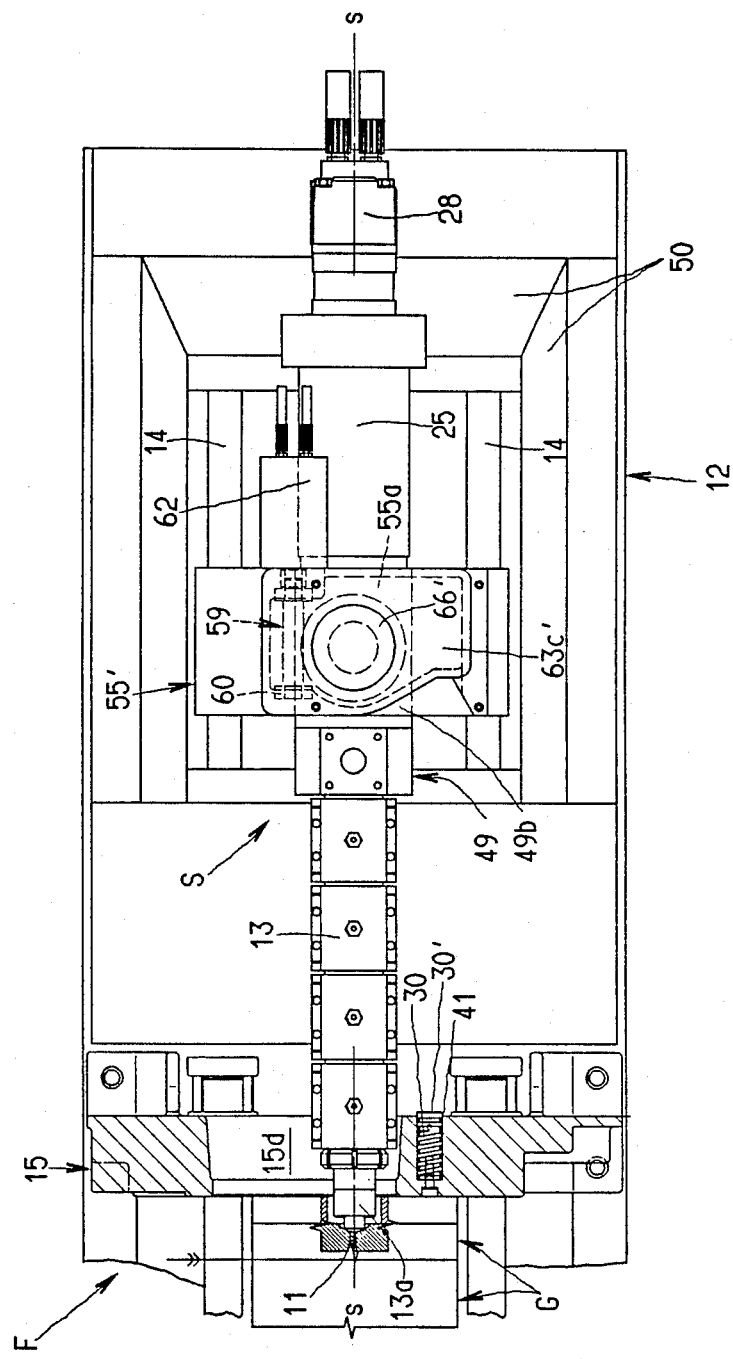
FIG. 8 is a partially sectional schematic top plan view of the construction illustrated in FIG. 7.
Figure 9:
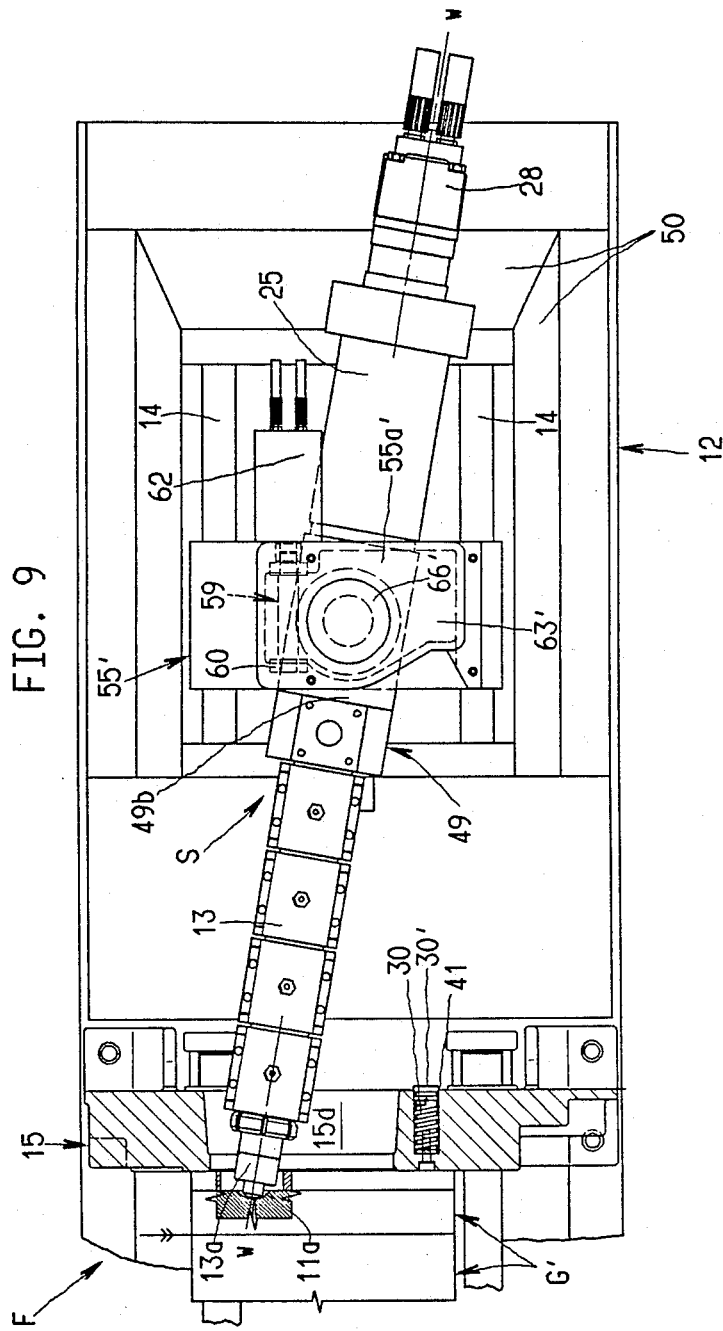
FIG. 9 is a view similar to FIG. 8, showing the second preferred embodiment positioned for injection other than along the central injection axis.

The injection molding unit S of the injection molding machine is supported on a platform 55 (55') which, in turn, is mounted by means of a console 50 on the machine bed 12 in an orientation parallel to the central injection axis s—s. The injection molding unit S has a carrier block 49 which receives the plasticizing cylinder 13 at its frontal end in a bore in which a slide seat 70 for the plasticizing cylinder 13 is formed. At the rear part of the carrier block 49, that is, at its part oriented away from the mold closing unit F, there are supported drive aggregates 25 and 28 for the feed screw (visible in FIGS. 1, 6 and 13) received coaxially in the plasticizing cylinder 13. The plasticizing cylinder 13 can be locked in the seat 70 by means of radially guided slides 69 (FIGS. 4 and 7). The slides 69 project into recesses of the plasticizing cylinder 13 in the locking position. The carrier block 49 is, together with the platform 55 (55'), movable rearwardly with respect to the plasticizing cylinder 13, once the latter is axially immobilized with respect to the machine bed 12, for the purpose of releasing (pulling off) the plasticizing cylinder 13 from the injection molding unit S.

The carrier block 49 is, at a rearward carrier block portion 49b pivotally supported between parallel side plates 55a, 55b (55a', 55b') of the platform 55 (55') by means of pivot shafts 57, 57' (58, 58'). The side plates 55a, 55b (55a', 55b') form a single-piece, cast component with the platform 55 (55'). The side plates have planar guide faces oriented towards and guidingly cooperating with respective opposite planar faces of the carrier block 49, thus providing an improved guide for the pivotal motion of the injection molding unit S.

By virtue of this arrangement, the injection molding unit S may be pivoted relative to the platform 55 (55') from a first working position defined by the central injection axis s—s for a mold assembly G having a central opening, in a predetermined pivotal direction (injection pivoting) into at least one further working position (injection position) defined by an injection axis w—w for serving a mold assembly G' which has an off-center injection opening.

Figure 10:
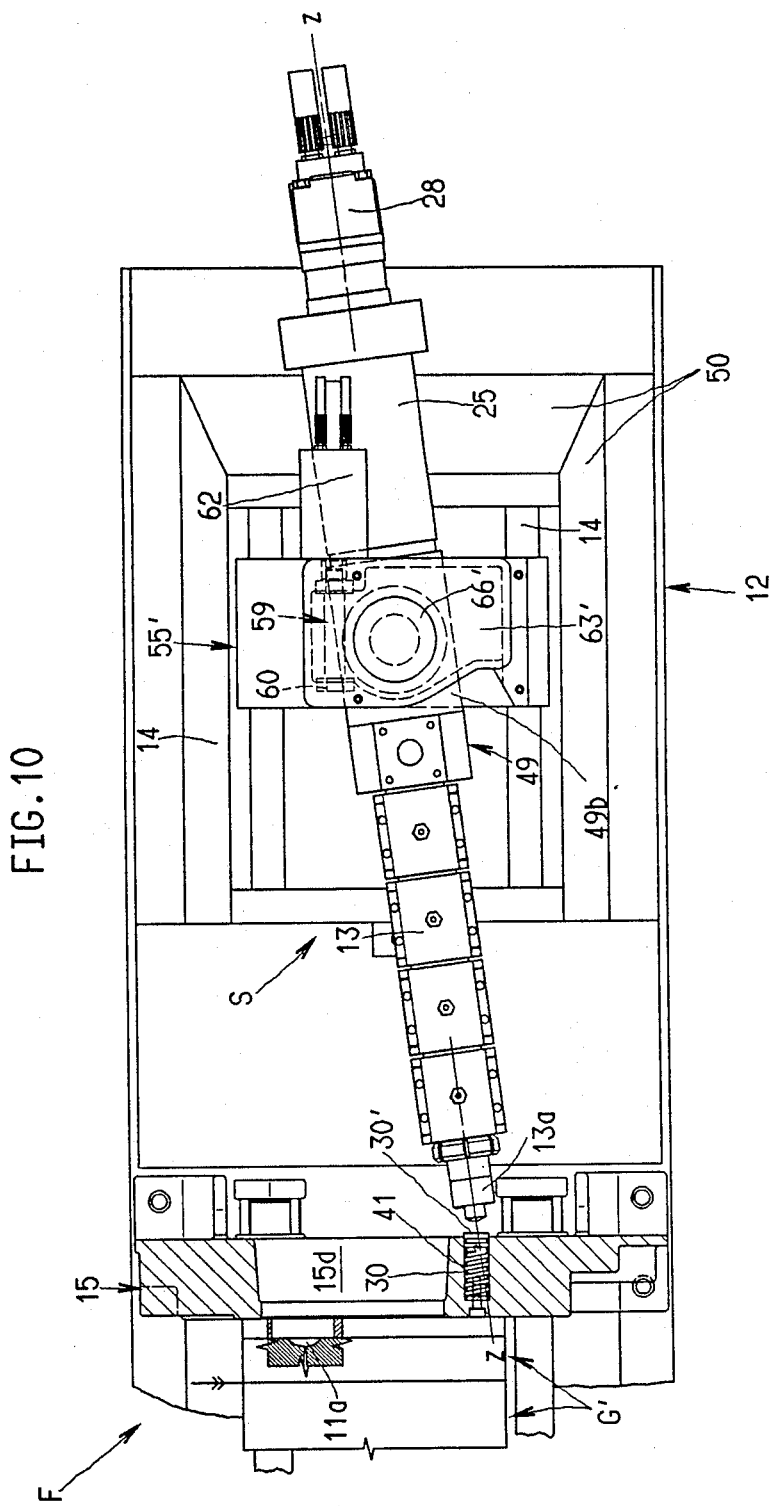
FIG. 10 is a view similar to FIG. 8, showing the second preferred embodiment positioned for a blank injection stroke.
Figure 11:
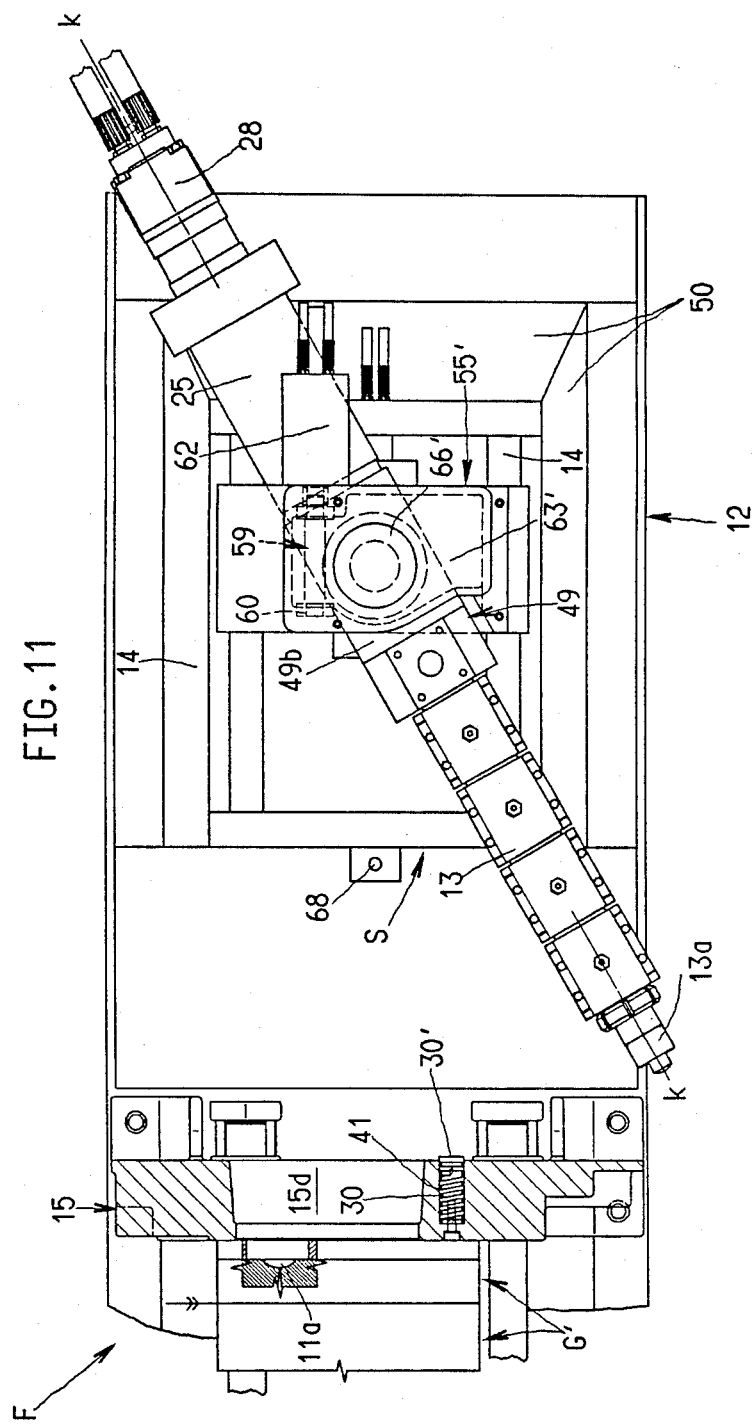
FIG. 11 is a view similar to FIG. 8, showing the second preferred embodiment in a pivoted position for disassembly.
Figure 12:
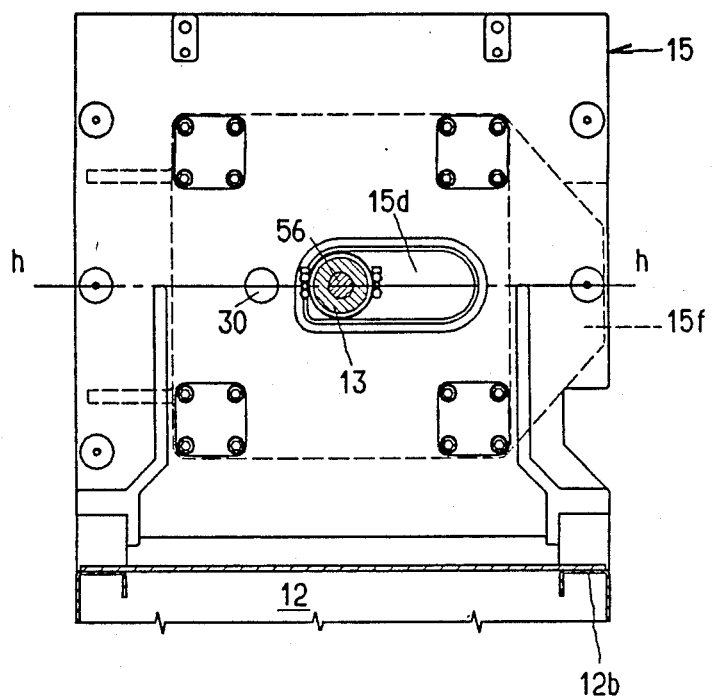
FIG. 12 is a sectional view taken along line XII—XII of FIG. 7.
Figure 13:
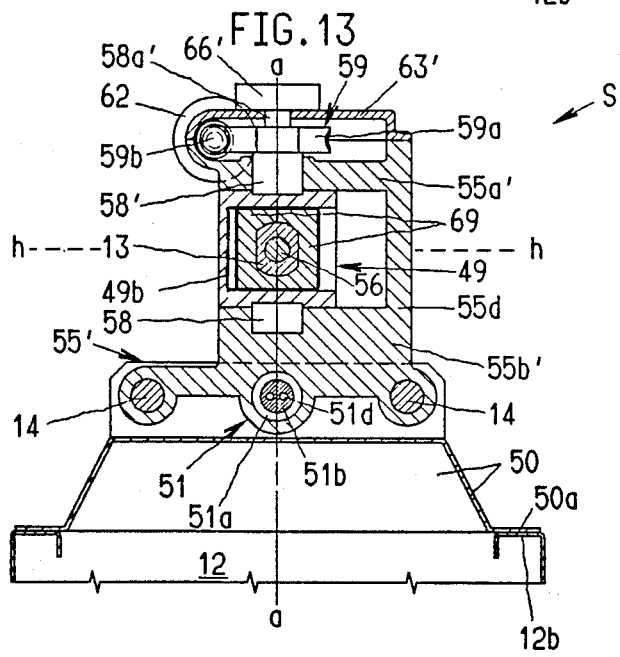
FIG. 13 is a sectional view taken along line XIII—XIII of FIG. 7.

In the embodiment according to FIGS. 1-6, the pivotal motion of the injection molding unit S occurs in a vertical pivotal plane a—a (FIGS. 5 and 6) containing the central injection axis s—s, while in the embodiment according to FIGS. 7-13 the pivotal motion occurs in a horizontal pivotal plane h—h (FIGS. 12 and 13).

Figure 3:
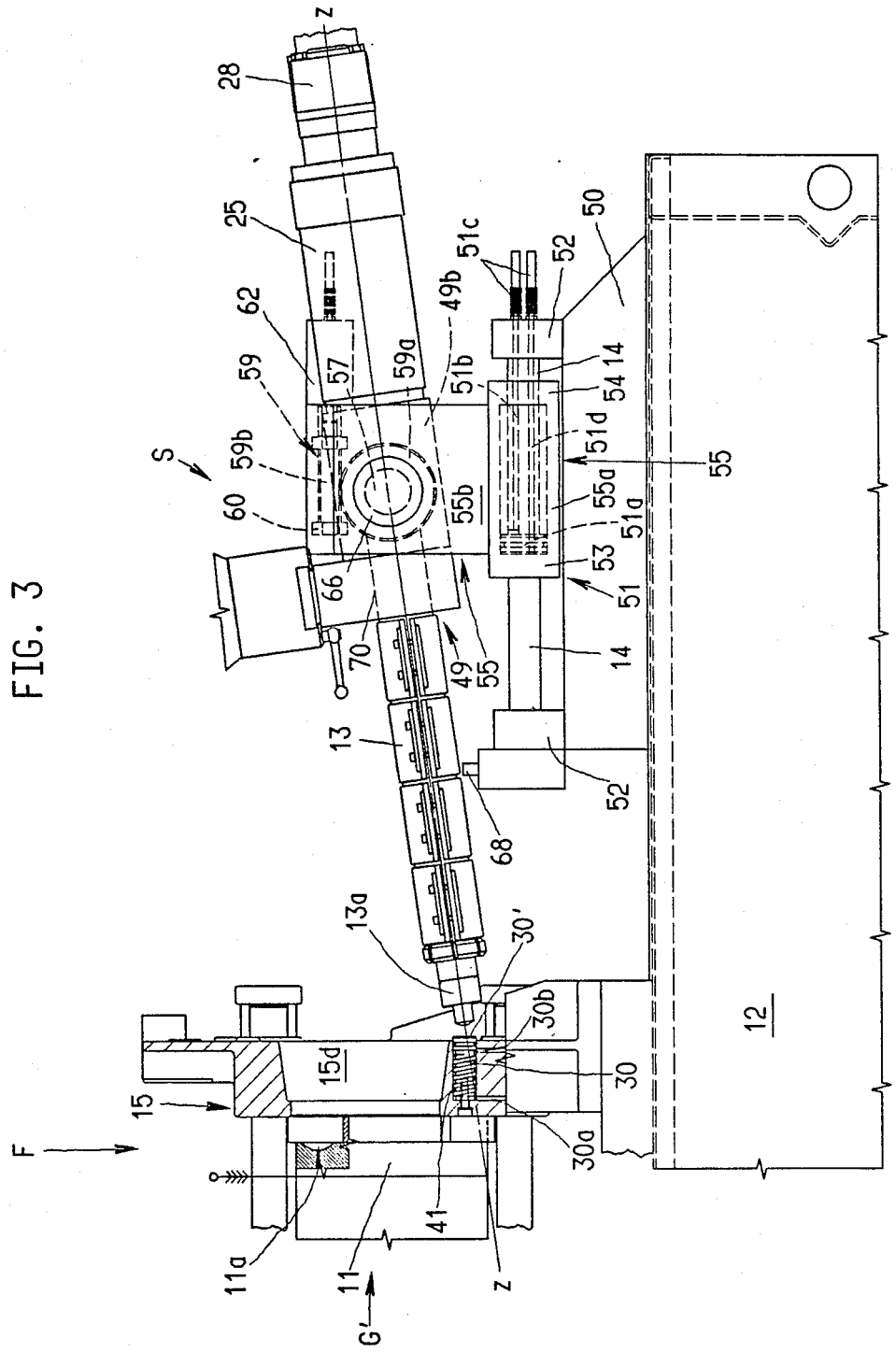
FIG. 3 is a view similar to FIGS. 1 and 2, showing the preferred embodiment pivoted into a position for performing a blank injection stroke.

With particular reference to FIGS. 3 and 10, the carrier block 49, together with the injection molding unit S is also swingable in the pivotal plane a—a (first embodiment) or h—h (second embodiment) into an emptying position which has an injection axis z—z. The direction of swinging motion in either embodiment is opposite to the pivotal motion for assuming a working position to serve the mold assembly G' having a non-central injection opening.

In the material emptying position (position of blank injection), the plastic material ejected under pressure from the nozzle 13a of the plasticizing cylinder 13 impinges on an impact face 30' of the stationary mold carrier 15, externally of the passage 15d. After the injected material collides with the impact face 30', it hardens and drops off, ready for removal.

In order to accelerate the hardening (cooling) of the plastic material, the impact face 30' is cooled by a cooling channel 41 which is provided in the stationary mold carrier 15 and which guides a coolant therein. The cooling channel 41 is formed about the circumference of a threaded bolt 30 received in a corresponding bore provided in the stationary mold carrier 15. By virtue of this arrangement, the cooling channel 41 extends helically and is bounded, on the one hand, by the surface of the threaded bolt 30 and, on the other hand, by the cylindrical inner wall of the bore. The impact face 30' is constituted by the outer radial face of the threaded bolt 30, projecting rearwardly from the rear surface of the stationary mold carrier 15. The supply and return conduits for the coolant are designated at 30a and 30b, respectively.

With particular reference to FIGS. 1, 4 and 7, the platform 55 (55') is driven relative to the machine bed 12, in a direction parallel to the injection axis s—s, by means of a hydraulic drive cylinder which is formed in a cylinder bore in the platform 55 (55') and an axially stationary piston 51a slidable therein. The pair of columns 14 on which the platform 55 (55') is guided are supported on the machine bed 12 by means of the console 50. The latter is made of sheet metal and engages crimped edge zones 12b of the machine bed 12 by horizontal longitudinal edges 50a as illustrated in FIGS. 6 and 13. The throughgoing cylinder bore provided in the platform 55 (55') is closed off by closures 53 and 54 which bound the cylinder chamber of the drive cylinder. The piston 51a is axially fixedly held at its piston rod 51b by means of a securing bar 52. The cylinder chambers on either side of the piston 51a are supplied by a hydraulic fluid via nipples 51c as well as axial channels 51d provided in the piston rod 51b.

The pivotal motion of the injection molding unit S is effected by a worm gear drive 59 whose pinion 59a is mounted on the pivot shaft 57' (58').

The embodiment illustrated in FIGS. 1–6 is constructed for a pivotal motion of the injection molding unit S in a vertical plane while the embodiment illustrated in FIGS. 7–13 is adapted for a pivotal motion in a horizontal plane. The two embodiments, however, differ structurally only slightly from one another: in case of a horizontal pivotal motion in the pivotal plane h—h a potentiometer 66 which monitors the angular position of the injection molding unit S, is arranged on the side of the worm gear pinion 59a at the pivotal part 59b of the carrier block 49. In case of an arrangement for a vertical pivotal motion of the injection molding unit S in a pivotal plane a—a, the potentiometer 66 is arranged on the pivotal part 49b on that side which is opposite from the worm gear pinion 59a. In the embodiment according to FIGS. 1–6, the side plates 55a, 55b of the platform 55 are arranged at equal distances from the vertical pivotal plane a—a. The pinion 59a and the worm 59b which is arranged parallel to the injection axis s—s and axially immobilized in the side plate 55a are covered by a vertical closure. In the embodiment according to FIGS. 7–13 the upper pinion 59a and the worm 59b are covered by a horizontal lid 63'. The upper pivot shaft 58' is traversed by an extension pin 58a' on which the potentiometer 66' is mounted. The pivot shafts 57' and 58' are supported in the horizontal side plates 55a',55b' which are connected to one another by a vertical, lateral web 55d. The lower side plate 55b' is formed as a thickened portion of the platform 55'.

As may be observed particularly in FIGS. 4 and 7, the slides 69 for locking the plasticizing cylinder in the carrier block 49 are slidable in a direction which is oriented perpendicularly to the pivot shafts 57' and 58'. This arrangement results in a particular space-saving construction of the part 49b of the carrier block.

The intended program-controlled locking of the plasticizing cylinder by means of the slides 69 is known by itself. It is also known, as disclosed in U.S. Pat. No. 4,708,622, which is incorporated herein by reference, to axially immobilize the plasticizing cylinder by means of a program-controlled arresting pin 68 and separate it from the carrier block 49 by moving the latter axially away form the plasticizing cylinder 13. The drive aggregate 25 for performing the axial stoke of the feed screw 56 and the drive aggregate 28 for rotating the feed screw 56 are supported by the carrier block 49 in a cantilevered manner.

During programmed control, the potentiometer 66 (66') which operates as an angular displacement detector, applies to the computer (not shown) of the injection molding machine signals required for moving the injection molding unit S into the desired pivotal position. By means of the programmable pivotal motion of the injection molding unit S, all working positions, including the blank injection position and the dismantling position may be reached. The passage of coolant through the cooling channel 41 in the stationary mold carrier 15 may also be controlled by a computer program as a function of the transition of the injection molding unit S into the position of blank injection. In both embodiments the closure 63 (63') for the pinion 59a and the worm 59 forms with adjoining side plates 55a (55a') a housing for the worm gear drive 59. In either case the worm 59b is driven by a motor 62 which is supported fixedly in the adjoining side plate 55a (55a'). The worm 59b which may be connected to the motor 62 by means of a clutch is rotatably supported in bearing components 60 of the side plate 55a (55a').

The potentiometer 66 which is, in the embodiment illustrated in FIGS. 1–6, secured to the side plate 55b of the platform 55, monitors the rotation of the adjacent rotary shaft 57 while the potentiometer 66' secured to the lid 63' in the embodiment illustrated in FIGS. 7–13 monitors the pin extension 58a which traverses the closure 63' and which forms part of the adjacent rotary pin 58'. It is noted that by connecting the drive 59 directly to the pivot shaft of the carrier block 49, a relatively rapid program-controlled pivotal motion of the injection molding unit S is achieved.

As may be observed in FIG. 12, the central zone of the stationary mold carrier 15 is, on its right-hand side, extended by a portion 15f and thus reinforces the enlarged passage 15d.

Summarizing the various working positions of the injection molding unit S, it may assume a working position for a normal, symmetrical injection operation along a central injection axis s—s to cooperate with the mold assembly G having a central injection opening 11 (FIGS. 1, 4, 7 and 8); it may assume a working position for a normal, asymmetrical injection operation along a non-central injection axis w—w to cooperate with the mold assembly G' having a non-central injection opening 11a (FIGS. 2 and 9); it may assume a working position beyond that for an asymmetrical injection for a blank injection along an injection axis z—z (FIGS. 3 and 10); and it may assume a position beyond the position for blank injection, for allowing dismantling or maintenance work thereon (FIG. 11).

The present disclosure relates to subject matter contained in Federal Republic of Germany Patent Application No. P 37 25 220.8 (filed July 30th, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an injection molding machine having a central injection axis and including
   a machine bed;
   a mold closing unit arranged on the machine bed and adapted to selectively receive a first type of mold assembly having a central injection opening or a second type of mold assembly having a non-central injection opening;
   a platform mounted on the machine bed;
   an injection molding unit supported on the platform; said injection molding unit including a carrier block; a plasticizing cylinder received in said carrier block and a feed screw received in said plasticizing cylinder;
   a first drive means for displacing said injection molding unit parallel to said central axis relative to said machine bed; and
   a second drive means for selectively pivoting the injecting molding unit in a pivotal plane including said central injection axis, into a first working position in which the injection molding unit cooperates with a mold assembly of the first type or into a second working position in which the injection molding unit cooperates with a mold assembly of the second type;
   the improvement comprising
   two side plates affixed to and forming part of said platform; said side plates being oriented parallel to one another and being spaced in a direction transverse to said central injection axis; said side plates flanking said carrier block of said injection molding unit; and
   axially aligned, spaced pivot shafts connected to respective said side plates and said carrier block at opposite sides thereof for supporting said injection molding unit on said side plates for pivotal motion in said pivotal plane; one of said pivot shafts being rotatably supported in the repective side plate and being torque-transmittingly connected to said carrier block; said second drive means being directly connected to said one pivot shaft;
   further wherein
   said second drive means comprises a worm gear drive including a worm gear and a pinion meshing with said worm gear; said pinion being affixed to said one pivot shaft for directly connecting said second drive means to said one pivot shaft;
   said carrier block having first and second opposite block sides facing a respective said side plate; said one pivot shaft carrying said pinion being attached to said carrier block at said first block face thereof;
   and a potentiometer arranged at one of the first and second sides for monitoring angular positions of said injection molding unit.

2. An injection molding machine as defined in claim 1, further comprising means for axially immobilizing said plasticizing cylinder on said machine bed, whereby said plasticizing cylinder is separable from said carrier block by displacing said carrier block parallel to said central injection axis in a direction away from said mold closing unit.

3. An injection molding machine as defined in claim 1, wherein said side plates comprising planer slide faces for glidingly guiding said carrier block therebetween.

4. An injection molding machine as defined in claim 1, wherein said platform and said side plates constitute a single cast component.

5. An injection molding machine as defined in claim 1, further comprising two parallel-spaced guide columns extending parallel to said central injection axis and passing through said platform; said columns being arranged for supporting said platform for a motion therealong; said first drive means comprising a hydraulic cylinder formed in said platform and oriented parallel to said central injection axis, a piston fixedly held relative to the machine bed and received for reciprocation in said hydraulic cylinder and means for supplying hydraulic pressure to said hydraulic cylinder.

6. An injection molding machine as defined in claim 1, wherein said plasticizing cylinder has an injection nozzle and further wherein said mold closing unit comprises a stationary mold carrier having a throughgoing passage adapted to be traversed by said injection nozzle to cyclically engage a mold assembly held in said mold closing unit; said stationary mold carrier further having an impact face situated externally of said throughgoing passage and facing in a direction of said injection molding unit; said injection molding unit having a third pivotal position which, together with said second pivotal position, flanks said first pivotal position; in said third pivotal position said injection nozzle being oriented towards said impact face for ejecting material onto said impact face in the course of a blank injection step.

7. An injection molding machine as defined in claim 6, wherein said plasticizing cylinder has a longitudinal axis, and said stationary mold carrier has an outer peripheral outline; further wherein said injection molding unit has a fourth pivotal position which, together with said second pivotal position, flanks said first and third pivotal positions; in said fourth pivotal position said longitudinal axis of said plasticizing cylinder extending externally of said outer peripheral outline of said stationary mold carrier.

8. An injection molding machine as defined in claim 6, further comprising means defining a coolant channel within said stationary mold carrier; said coolant channel adjoining said impact face for a cooling thereof.

9. An injection molding machine as defined in claim 1, wherein said side plates and said first and second block faces are oriented vertically, whereby said pivotal plane is vertical; further wherein said potentiometer is supported at said second block face of said carrier block.

10. An injection molding machine as defined in claim 1, wherein said side plates and said first and second block faces are oriented horizontally, whereby said pivotal plane is horizontal; further wherein said potentiometer is supported at said first block face of said carrier block.

11. An injection molding machine as defined in claim 10, further comprising a vertical web connecting said side plates to one another; said vertical web extending laterally of said carrier block.

* * * * *